United States Patent [19]

Meyer

[11] Patent Number: 4,665,811
[45] Date of Patent: May 19, 1987

[54] APPARATUS FOR PRODUCING THIN PORTIONS OF PASTA FILATA CHEESE

[76] Inventor: Marco M. Meyer, 2038 Green Tree Rd., Junction City, Wis. 54443

[21] Appl. No.: 750,312

[22] Filed: Jun. 27, 1985

Related U.S. Application Data

[62] Division of Ser. No. 621,451, Jul. 18, 1984, abandoned.

[51] Int. Cl.[4] .................. A01J 25/00; A23C 19/00
[52] U.S. Cl. ................................ 99/455; 99/460; 99/464; 99/466; 99/535
[58] Field of Search ............. 99/452, 453, 455, 456, 99/459, 460, 461, 464, 535; 426/517, 515, 512, 516, 518, 582; 100/153, 176

[56] References Cited

U.S. PATENT DOCUMENTS

| | | | |
|---|---|---|---|
| 3,697,292 | 10/1972 | Lauck et al. | 426/582 |
| 3,887,719 | 6/1975 | Miller | 99/460 X |
| 4,288,465 | 9/1981 | Meyer | 426/582 |
| 4,339,468 | 7/1982 | Kielsmeier | 99/535 |

*Primary Examiner*—Timothy F. Simone
*Attorney, Agent, or Firm*—Andrus, Sceales, Starke & Sawall

[57] ABSTRACT

A technique for producing sliced, shredded and/or diced cheese of the pasta filata type. The technique utilizes a plurality of rollers which reduce an extruded strand of cheese to a ribbon of the desired thickness. The rollers are heated and a spray of warm water is applied to the cheese to keep the ribbon plastic and pliable. The edges of the sheet are trimmed, and then the sheet is run through a brine tank or sprayed with a brine mixture to salt the sheet for the desired amount of time. Thereafter, the sheet is cooled and cut into any desired shaped to create an end product of controlled size and weight. The trimmings are returned to the extruder, reheated, and reused.

23 Claims, 5 Drawing Figures

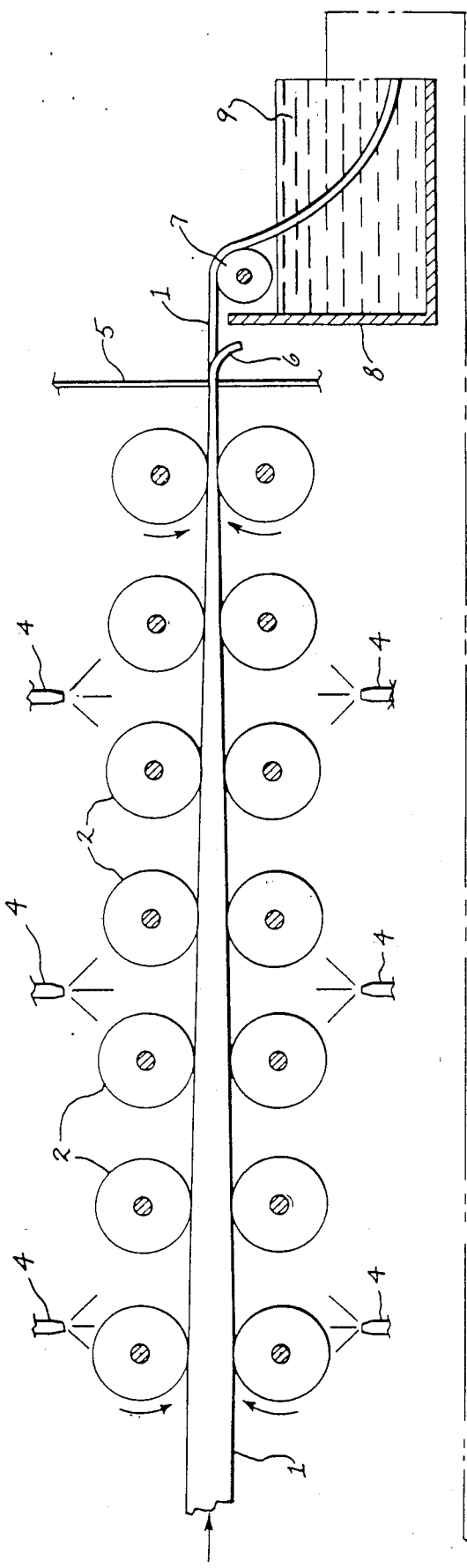
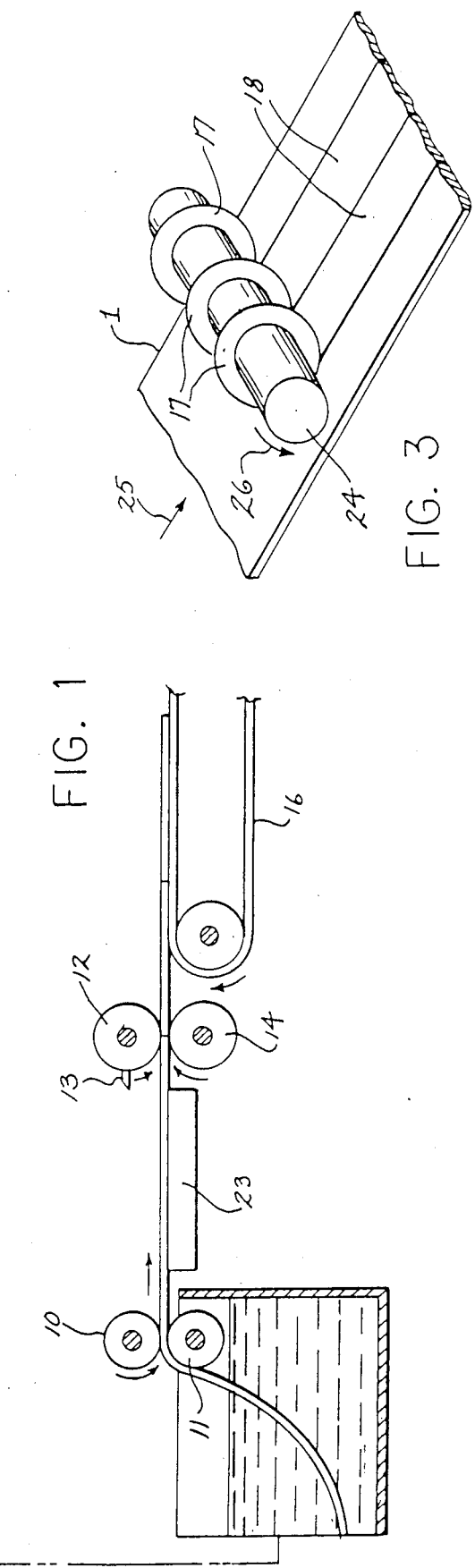
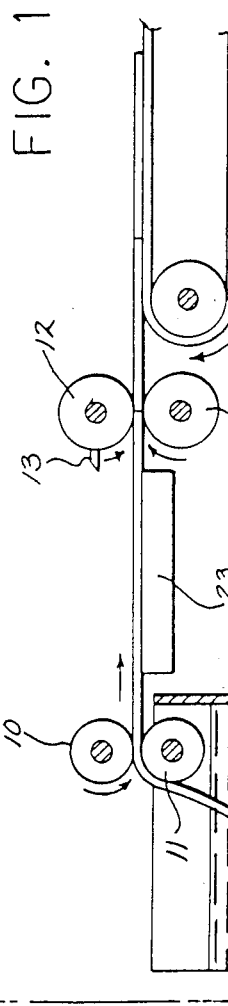
FIG. 1
FIG. 3

APPARATUS FOR PRODUCING THIN PORTIONS OF PASTA FILATA CHEESE

This is a division of application Ser. No. 621,451 filed July 18, 1984, abandoned.

The present invention relates to an apparatus for producing food, and more particularly to a technique for producing sliced, shredded and/or diced are mozzarella and provolone.

Pasta filata cheeses, such as mozzarella, provolone, or blends thereof, become plastic i.e. moldable and pliable when heated. The plastic nature of pasta filata cheeses is to be distinguished from other types of cheeses such process cheeses that become molten upon heating.

Pasta filata cheese is manufactured by cooking, mixing and stretching a curd of the pasta filata type. The warm plastic curd is then typically molded into a six pound or twenty pound block. The block is then immersed in brine for twenty four hours after which it is removed, wrapped and aged. Aging facilitates a proteolytic process within the cheese that provides desired physical properties such as improving its slicability by mitigating against brittleness. This process typically takes seven to ten days and requires intermediate packaging prior to slicing, shredding and/or dicing to protect the cheese from mold.

At present pasta filata cheeses are typically shredded, diced or sliced for use in foods such as pizza. In order to accomplish this, the cheese blocks must be taken from storage, unwrapped, and then shredded, diced or sliced. Such an operation is labor intensive and requires a completely different line in the manufacturing facility resulting in increased costs or production. Additionally, requiring intermediate storage for the cheese also dictates that the cheese be packaged for storage. Thus, the use of intermediate packaging materials also represents significant lost dollars.

The food industry places a premium on portion control as a means of insuring the use of precise amounts of ingredients. For shredded and diced cheese, either a scale or volume measuring have generally been used for portion control. Slices are a means for providing portion control of cheese on pizzas without using the additional step of weighing. However, to provide such control the block of pasta filata cheese must be trimmed to exact dimensions and then cut to slices of predetermined thickness. As noted above, this results in added labor expense, and additionally creates an enormous amount of trim or waste. To produce a circular slice for pizza also creates large amounts of waste or requires special block molds of a cumbersome nature.

It is thus desirable to provide a technique for continuously producing sliced, shredded and/or diced cheese of exact size and weight.

An apparatus for producing cheese of a pasta filata type, such as mozzarella, provolone and blends thereof.

The technique includes the steps of placing the cheese in a heated, deformable state, forming an extended ribbon of cheese, applying pressure to the ribbon of cheese to reduce its thickness to a predetermined size, and cutting the flattened ribbon. The process enables various forms of cheese to be produced in a continuous manner as a contiguous extension of the cooking and stretching line of a cheese manufacturing plant. The process thus eliminates the need for interim packaging as well as the need for a different line and additional labor normally necessary to slice, shred or dice block cheese of this type.

In order to accomplish these objectives, the step of applying pressure to the cheese ribbon is further defined as passing the ribbon of cheese through a series of successively more closely spaced rollers to reduce the thickness of the ribbon to a predetermined size corresponding to the desired thickness. This thickness can be varied by adjusting the spacing between the rollers. Thus, a cheese ribbon of varying thicknesses can be produced depending upon the end was of the cheese.

In order to keep the cheese ribbon in a plastic and pliable condition, the cheese is maintained in a heated state of between about 120° F. to about 160° F. depending upon the particular character of the cheese being processed while the thickness dimension of the cheese ribbon is being reduced. In order to accomplish this, the rollers are heated and a heated fluid such as hot water is sprayed on both sides of the cheese ribbon.

After the cheese ribbon exits from the rollers and has reached its final thickness dimension, its rough edges are trimmed to provide the cheese ribbon with a uniform width. The trimmed portions or "rework" are then fed back to the cooker where it is heated into a deformable state for reforming into a ribbon of cheese. At this stage the cheese can be reworked without significant loss of product quality and integrity since the trimmed portions are recycled to the cooker before they are cooled and salted. This reduces waste and manufacturing costs.

After the cheese ribbon has been rolled and trimmed to its final dimensions, it is salted and cooled. The sealing is accomplished by passing the cheese ribbon through a brine bath which is maintained at about 15°-40° F. with about a 65-90% salt solution, or by spraying a like brine solution against opposite surfaces of the cheese ribbon. Brining time i.e. salting and cooling time is reduced from about 24 hours generally required for blocks to a maximum of about 15 minutes for the cheese ribbon. This is due to the fact that there is much more cheese surface exposed to facilitate the cooling and salting.

Although the salting or brining step results in some cooling, it is preferred that the primary cooling of the cheese ribbon take place after salting by passing the ribbon over a glycol-filled cooling table. Alternately, the cheese ribbon could snake around a plurality of glycol-filled rollers or other cooling means.

After the cooling and brining step the cheese ribbon is ready for final cutting to produce shredded, diced and/or sliced cheese. The final cutting produces cheese portions of the desired weight and size. Additionally, the finished product may then be packaged and sent to a warehouse as opposed to blocks which require interim storage and packaging. Thus, the process eliminates the need for interim packaging and the materials and labor cost which accompanies such storage.

The invention is directed to an apparatus for producing shredded, diced and/or sliced cheese of a pasta filata type includes means for forming a heated, deformable ribbon of cheese, means for applying pressure to the ribbon of cheese to flatten the cheese to a predetermined thickness, and means located downstream of the pressure applying means for cutting the flattened ribbon.

In order to flatten the cheese ribbon, it is passed through a series of successively more closely spaced rollers so that as the ribbon exits from the nip of the last set of rollers it has been reduced in thickness to the desired size. The rollers may include textured surfaces in the shape of dimples which aid in driving the cheese through the rollers and provide for kneading the cheese ribbon. Also, the upstream rollers may be convex in shape to aid in initial flattening of the cheese ribbon, and the downstream rollers become progressively more cylindrical in shape and successively more closely spaced to provide exact thickness dimension control for the cheese ribbon.

After the cheese ribbon is reduced to its final thickness, it edges are trimmed by a pair of wires, "squeeze" knives, motorized knives, or other means extending normal to the direction of travel of the ribbon. The apparatus also includes means for returning the trimmed portions to the cooker for reworking purposes thus reducing waste.

The apparatus also includes means for applying a brining fluid to the cheese ribbon subsequent to its edge trimming. The brine applying means includes to tank filled with brine of about 65-90% salt solution at about 15°-40° F. which receives the cheese ribbon to salt the cheese. Alternatively, the brine applying means may include means for spraying a like brine solution to both sides of the cheese ribbon.

The apparatus further includes means for cooling the cheese ribbon. Although the brine applying means will result in some cooling, it is preferred that the primary cooling of the cheese ribbon take place downstream of the brine applying means. Primary cooling is accomplished by means of a glycol-filled cooling table over which the cheese ribbon passes. Alternately, a plurality of glycol-filled rollers or other cooling means may be employed.

The cutting or severing means cuts the cheese ribbon to produce a sliced, shredded and/or diced end product. The cutting or severing means may include a rotary knife which intermittently cuts the cheese ribbon transversely to its direction of movement to produce rectangular shaped slices, or a plurality of parallel cutters followed by a rotary knife which sever the cheese ribbon into a series of "strings", or a stamping means for punching out desired shapes from the cheese ribbon. The end product can thus be of varying shapes and weights depending upon the desired end use for the cheese. The apparatus also enables the manufacturer to produce an end product having any desired weight and shape to exact portions.

The present invention thus provides an apparatus for continuously producing cheese of the pasta filata type wherein exact portions of any desired shape and weight can be produced. The apparatus eliminates unnecessary waste, interim packaging, and substantially reduces the cost of manufacturing exact weight portions of cheese.

The drawings illustrate the best mode presently contemplated of carrying out the invention.

In the drawings:

FIG. 1 is a fragmentary schematic side view in elevation illustrating an apparatus for producing cheese of the pasta filata type;

FIG. 3 is a fragmentary perspective view illustrating a second technique of cutting the cheese ribbon produced by the apparatus of FIGS. 1 and 2;

Figure 2:
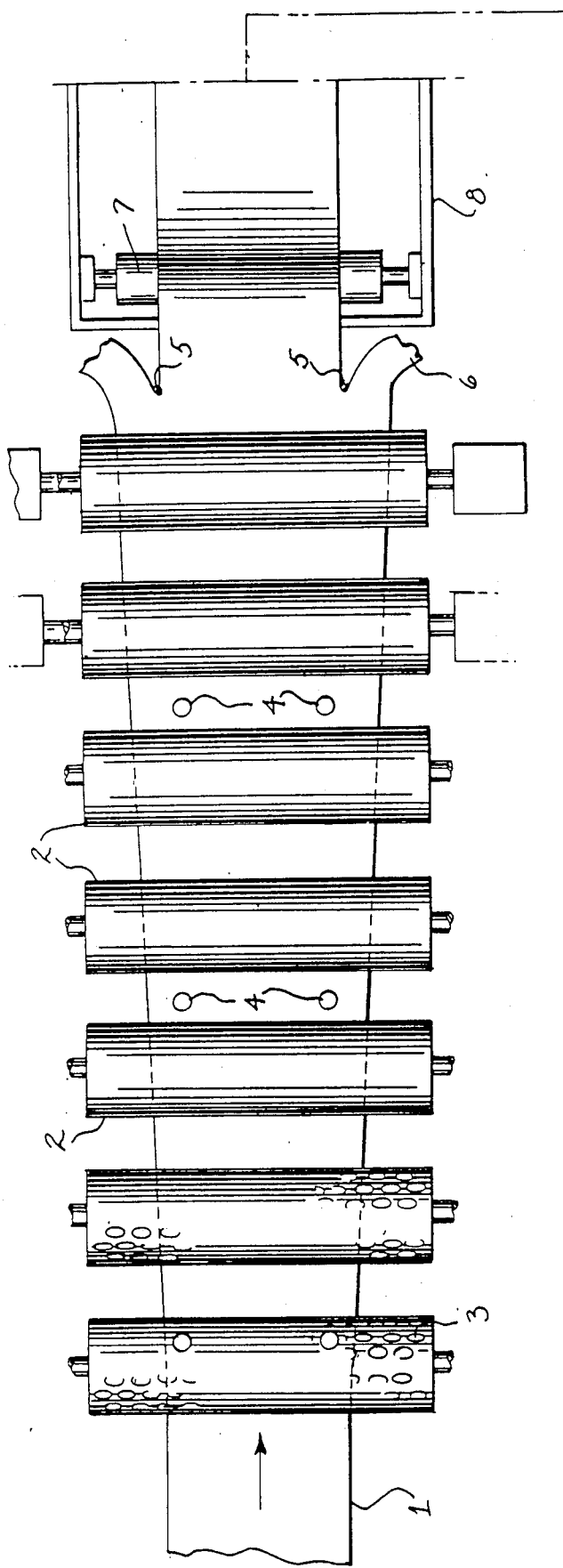
FIG. 2 is a fragmentary plan view of the apparatus of FIG. 1.
Figure 2:
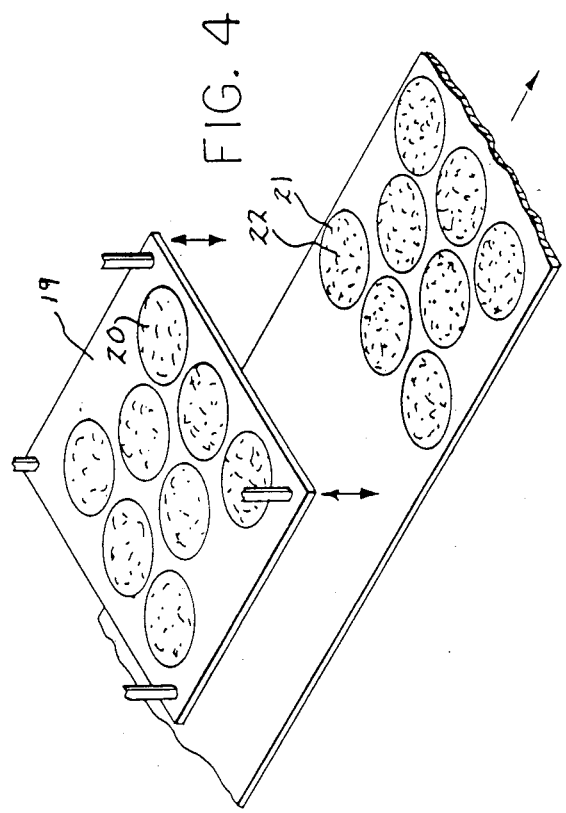

Referring now to the drawings, FIGS. 1 and 2 illustrate an apparatus for producing cheese of the pasta filata type. A pasta filata type cheese is a cheese such as mozzarella, provolone, blends thereof, or a cheese of this type blended with a cheese analog or imitation cheese. Pasta filata type cheese becomes "plastic" i.e. moldable and pliable when heated to a temperature range of between 120° F. and 150° F. whereas other type cheese such as process types become molten when heated in this temperature range.

Figure 5:
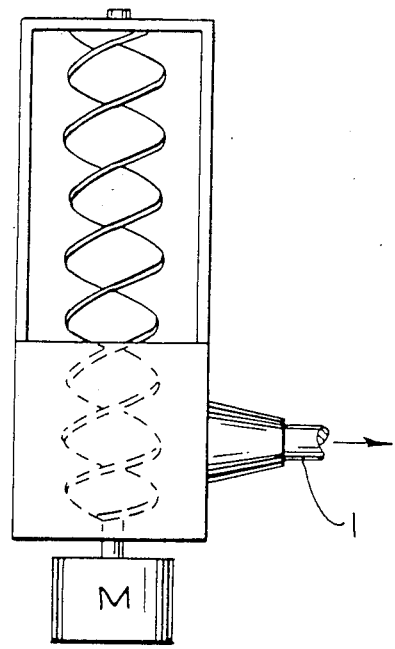
FIG. 5 is a fragmentary top view of means for forming a heated ribbon of pasta filata cheese.

The manufacture of pasta filata type cheese involves cooking, mixing and stretching a curd of the pasta filata type in a cooking vessel (not shown) and extruding the material to form an extended ribbon 1 of cheese as by means of the apparatus shown in FIG. 5. The cheese is extruded at a temperature of from about 120° F. to about 160° F. The cheese ribbon 1 is then passed through a series of successively more closely spaced rollers 2 in order to roll the product to a desired thickness. As shown, the rollers 2 at the upstream end of this section of the apparatus are spaced further apart from one another than the rollers at the downstream end. The ribbon 1 passes through the nip formed between corresponding pairs of upper and lower rollers 2 and applies pressure to cheese ribbon 1 which is normal to the longitudinal direction of ribbon 1 and the path of movement thereof. Rollers 2 flatten the ribbon 1 of cheese by reducing the size of ribbon 1 in a dimension parallel to the direction of pressure application to a predetermined size corresponding to the desired thickness of the slices. It should be noted that the upstream rollers 2 are convex in shape thus enabling them to spread the cheese laterally while at the same time flattening ribbon 1. The downstream rollers 2 become progressively more cylindrical in shape. Also, as seen best in FIG. 2, rollers 2 may include a textured surface in the form of dimples 3. Dimples 3 knead the cheese in ribbon 1 and also provide sufficient frictional contact with ribbon 1 to drive ribbon 1. The space between rollers 2 is adjustable to any desired dimension in order to provide a ribbon 1 having the desired thickness.

As previously noted, ribbon 1 must be maintained at a temperature of between about 120° F. to about 160° F. In order to accomplish this, rollers 2 may be heated in any conventional manner so that contact with ribbon 1 maintains the heated state of the cheese. Additionally, a series of nozzles 4 are positioned above and below ribbon 1 and spray a heated fluid such as hot water against ribbon 1. Both the rollers 2 and the hot water should be maintained at a temperature of between about 120° F. to 160° F. so that ribbon 1 maintains its heated state wherein it is in a plastic condition.

After being flattened to its final thickness dimension, the lateral edges of a ribbon 1 are cut square by means of a pair of cutters 5 which extend normal to the longitudinal direction of ribbon 1. Cutters 5 may comprise a pair of wires, "squeeze" knives, motorized knives or other means that are adjustable so that the width of ribbon 1 may correspondingly vary to the desired dimension. The trimmed portions or rework 6 is fed back to the cooker. At this stage rework 6 can be recycled without any significant loss of product quality and integrity since it is not yet been cooled and salted.

Following the trimming of its edges, ribbon 1 passes over an idler roller 7 which is journalled in opposite sides of a tank 8 filled with brine 9. Brine 9 is about a 65–90% salt solution which is maintained at a temperature of about 15°–40° F. Ribbon 1 is then immersed in the brine bath which serves to salt and cool ribbon 1. Brining time is a maximum of about 15 minutes for ribbon 1. In contrast, brining time of typical blocks of such cheese is about 24 hours. Such a reduction is possible since there is much more cheese surface exposed to the brine solution to facilitate cooling and salting. As shown best in FIG. 1, ribbon 1 is passed through the brine solution in a relatively straight line with the least amount of bending possible since as the product is cooled it becomes less pliable possibly resulting in cracks and other unsightly surface mars if bent excessively.

As shown in FIG. 1, ribbon 1 exits from brine tank 8 by passing through the nip formed between a pair of rollers 10 and 11 which are journalled in opposite sides of tank 8. As shown, the upper roller 10 is the drive roller while the lower roller 11 is the idler roller.

Although passing ribbon 1 through brink tank 8 results in some cooling, it is preferred not to employ tank 8 as the sole cooling means for ribbon 1 since the salt content of ribbon 1 may become too high resulting in an unpalatable product. Thus, after salting, ribbon 1 is passed over a glycol-filled cooling table 23. Alternately, ribbon 1 may snake around a plurality of glycol-filled cooling rollers (not shown) or other cooling means.

After cooling and salting has been accomplished, the product is ready for final cutting. As shown in FIGS. 1 and 2, one method of cutting ribbon 1 includes the use of a rotary knife 12 which includes a blade 13 extending thereacross. As knife 12 rotates blade 13 rolls against the surface of a roller 14 positioned beneath knife 12 to cut ribbon 1 widthwise to form rectangular shaped slices 15. These slices 15 are then transported by a conveyor 16 for packaging and storage.

Another method of cutting ribbon 1 into "slices" is shown in FIG. 3. In this embodiment, a series of parallel spaced spart cutters 17 cut ribbon 1 to form a plurality of "strings" 18. As shown, cutters 17 extend in a direction normal to the direction of travel of ribbon 1. Strings 18 may then be cut transversely or widthwise if desired by the rotary knife 12. As shown, cutters 17 comprise disc-shaped knives mounted in spaced relation on a shaft 24 which in turn is rotated by a motor (not shown). Shaft 24 is rotated in the direction of movement of ribbon 1, i.e. if ribbon moves in the direction of arrow 25, shaft 24 is rotated counterclockwise in the direction of arrow 26 to provide a clean cut.

Figure 4:
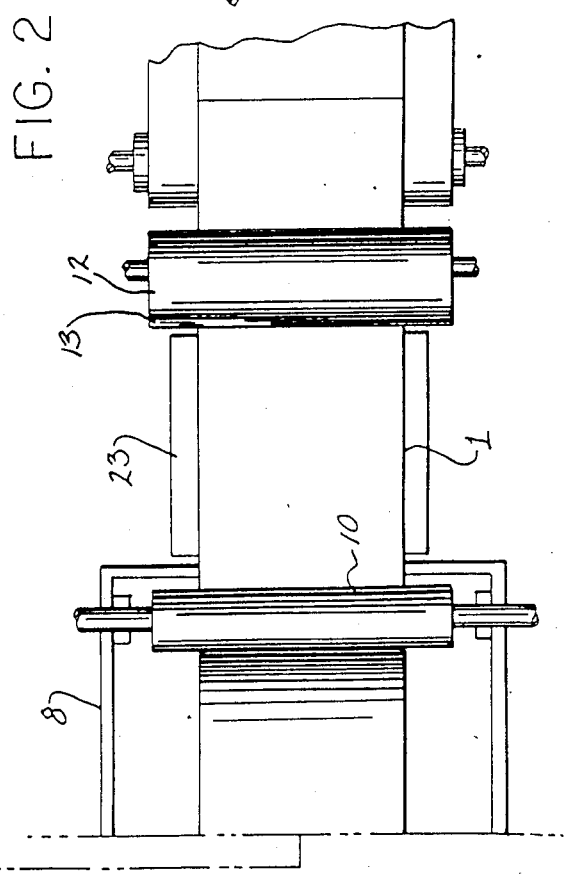
FIG. 4 is a fragmentary perspective view illustrating a third technique of cutting the cheese ribbon.

FIG. 4 shows yet another method of producing "slices" of cheese from ribbon 1. In this embodiment, ribbon 1 is stamp cut to produce slices of any desired shape. As shown, a punch 19 has a plurality of circular dies 20 form thereon. When punch 9 is reciprocated against ribbon 1, dies 20 cut through ribbon 1 and form a plurality of circular slices 21. It should be noted that slices 21 also include a plurality of holes 22 formed therein by dies 20. These holes are necessary when slices 21 are utilized with pizza so that heat may escape through the cheese when the pizza is cooked.

The ribbon 1 could also be slit and cross-cut so as to produce shredded and/or diced cheese of variable proportions, cross-sections and weight. As used herein, the term "sliced" cheese includes "shredded" and/or "diced" cheese, and the term "slicing" includes "shredding" and/or "dicing" cheese ribbon 1.

An apparatus for producing cheese of the pasta filata type has been illustrated and described. Various modifications and/or substitutions of the specific components described herein may be made without departing frm the scope of the invention. For example, instead of passing the ribbon 1 through a bath of brine which is physically contained within tank 8, the brine bath may be provided by a series of nozzles spraying the brining fluid against both sides of ribbon 1. The present invention thus provides an apparatus for continuously producing cheese of the pasta filata type to accomplish portion control by providing an end product of various shapes to the exact desired size and weight.

I claim:

1. Apparatus for producing thin, slice-like portions of cheese of the pasta filate type, said portions having a desired thickness and quantity of cheese, said apparatus comprising:
   means for forming a heated, deformable, ribbon of pasta filate cheese moving in a direction away from the point of formation;
   means receiving the ribbon of cheese and applying pressure to the heated, deformable ribbon of cheese in a single direction normal the direction of movement, said means applying pressure at a succession of points along the direction of movement for sequentially reducing the size of said ribbon in a dimension parallel to the direction of pressure application to a desired thickness while simultaneously increasing the dimension of the ribbon through free and unrestrained expansion in a dimension that is normal to the direction of pressure application and to the direction of movement thereby to form a flattened ribbon of cheese;
   means for maintaining the heated state of the cheese operatively associated with said pressure applying means; and
   means located downstream of said pressure applying means for severing the flattened ribbon into portions having the desired quantity of cheese.

2. The apparatus according to claim 1 wherein said pressure applying means comprises roller means.

3. The apparatus according to claim 2 wherein said roller means comprises a series of rollers.

4. The apparatus according to claim 3 wherein said series of rollers are successively more closely spaced in the direction of pressure application.

5. The apparatus according to claim 2 wherein at least one surface of said roller means applied to the ribbon of cheese is textured for providing a kneading and localized pressure varying action to the ribbon of cheese.

6. The apparatus according to claim 1 wherein said rollers are heated for maintaining the heated state of the cheese.

7. The apparatus according to claim 1 further including means for applying a heated fluid to the ribbon of cheese.

8. The apparatus according to claim 7 including means for applying hot water to the ribbon of cheese.

9. The apparatus according to claim 1 including means for trimming the edges of the flattened ribbon of cheese in a dimension normal to the direction of pressure application.

10. The apparatus according to claim 9 including means for returning the trimmed portions to the ribbon of heated deformable cheese.

11. The apparatus according to claim 1 further including means for applying a brining fluid to the ribbon of cheese at least subsequent to said pressure applying means.

12. The apparatus according to claim 11 wherein said brine applying means includes means for immersing the cheese in a bath of brining fluid.

13. The apparatus according to claim 11 wherein said means for applying a brining fluid comprises means for spraying the brining fluid on the ribbon of cheese.

14. The apparatus according to claim 11 wherein said means for applying a brining fluid further serves as a means for cooling the ribbon of cheese.

15. The apparatus according to claim 1 wherein said apparatus further includes means for cooling the ribbon of cheese at least subsequent to discharge from said pressure applying means.

16. The apparatus according to claim 15 wherein said cooling means applies a cooling fluid to the ribbon of cheese.

17. The apparatus according to claim 1 wherein said severing means is further defined as means for transversely cutting the flattened ribbon of cheese.

18. The apparatus according to claim 1 wherein said severing means is further defined as means for cutting out portions of the desired form from said flattened ribbon of cheese.

19. The apparatus according to claim 18 further including means for returning the remaining potions of the flattened ribbon of cheese to the ribbon of heated deformable cheese.

20. The apparatus according to claim 1 wherein said severing means is further defined as including means for longitudinally cutting the moving ribbon of cheese and means for transversely cutting the ribbon to obtain the slice-like portions.

21. The apparatus according to claim 15 wherein said cooling means includes a cooling plate.

22. The apparatus according to claim 3 wherein the rollers of said series initially receiving the ribbon of cheese present a convex outer surface to the ribbon of cheese.

23. The apparatus according to claim 22 wherein subsequent rollers in said series downstream of said initial rollers present progressively more cylindrically outer surfaces to the ribbon of cheese.

* * * * *

UNITED STATES PATENT AND TRADEMARK OFFICE
CERTIFICATE OF CORRECTION

PATENT NO. : 4,665,811

DATED : May 19, 1987

INVENTOR(S) : MARCO M. MEYER

It is certified that error appears in the above-identified patent and that said Letters Patent is hereby corrected as shown below:

Column 1, Line 9, After "diced" insert---cheese of the pasta filata type. Particularly suited---;

Column 2, Lines 32-33, Cancel "sealing" and substitute therefore---salting---.

Signed and Sealed this

Eighteenth Day of August, 1987

*Attest:*

DONALD J. QUIGG

*Attesting Officer*  *Commissioner of Patents and Trademarks*